United States Patent [19]
De Gaudenzi et al.

[11] Patent Number: 5,327,455
[45] Date of Patent: Jul. 5, 1994

[54] METHOD AND DEVICE FOR MULTIPLEXING DATA SIGNALS

[75] Inventors: Riccardo De Gaudenzi, Leiden; Roberto Viola; Carlo Elia, both of Oegstgeest, all of Netherlands

[73] Assignee: Agence Spatiale Europeene, Paris, France

[21] Appl. No.: 50,285

[22] PCT Filed: Aug. 28, 1992

[86] PCT No.: PCT/EP92/02001
§ 371 Date: Jul. 9, 1993
§ 102(e) Date: Jul. 9, 1993

[87] PCT Pub. No.: WO93/05589
PCT Pub. Date: Mar. 18, 1993

[30] Foreign Application Priority Data
Sep. 11, 1991 [FR] France .................. 9111202

[51] Int. Cl.⁵ .............................. H04K 1/00
[52] U.S. Cl. ........................... 375/1; 375/84; 375/106; 370/95.1
[58] Field of Search ............. 375/1, 84, 106; 370/95.1

[56] References Cited
U.S. PATENT DOCUMENTS

| | | | |
|---|---|---|---|
| 4,837,786 | 6/1989 | Gurantz et al. | 370/20 |
| 4,914,677 | 4/1990 | Yamaguchi et al. | 375/106 |
| 4,942,591 | 7/1990 | Nease et al. | 375/84 |
| 5,107,494 | 4/1992 | Johnson et al. | 370/95.1 |

OTHER PUBLICATIONS

DS SSMA with Some IC Realizations, D. C. Kemdirim, et al., IEEE vol. 8 No. 4, May 1990, pp. 663-674.
"Performance Analysis of M-ary Code Shift Keying in Code Division Multiple access systems", A. Hammer, et al. IEEE vol. 3, Jun. 1982,pp.7E.2.1—7E.2.5.
High Efficiency Voice Activated CDMA Mobile Communication System based on Master Code Synchronization, De Gaudenzi, et al., IEEE vol. 2, Nov. 1989.
Microcellular Direct-Sequence Spread-Spectrum Radio System Using N-path RAKE Receiver, U. Grob, et al., IEEE, vol. 8, No. 5, Jun. 1990 pp. 772-780.
Bandlimited Quasi-Synchronous CDMA: A Novel Satellite Access Technique for Mobile and Personal Communication Systems, De Gaudenzi, et al., IEEE, vol. 10, No. 2, Feb. 1992, pp. 328-343.

*Primary Examiner*—David C. Cain
*Attorney, Agent, or Firm*—Fitzpatrick, Cella, Harper & Scinto

[57] ABSTRACT

Before modulating the transmission carrier, each binary data signal is individually coded as a discrete symbol belonging to a PSK constellation of N symbols which are combined with N discrete points to produce two binary signal streams of which the first is in phase with the incoming signal while the second is in phase quadrature with said incoming signal. Each of said two binary signal streams is assigned its own signature by combining it with a discrete spreading code to produce two spread composite signal streams each of which is to be applied to a modulator. Both of said spreading codes are substantially orthogonally cross-correlated. The method may be used in a satellite communications system, in particular for digital sound transmission and communication via land microterminals.

5 Claims, 3 Drawing Sheets

METHOD AND DEVICE FOR MULTIPLEXING DATA SIGNALS

The present invention relates to satellite communication systems and in particular a Code Division Multiple Access (CDMA) communication system suitable for transmitting band-limited data.

Communication satellites are already widely used for data transmission. Now, the substantial possibilities offered by microelectronics are opening up new applications for telecommunication satellites such as digital sound broadcasting and very small aperture mobile and personal terminal (VSAT) communications. Digital sound broadcasting, in particular, is a very promising field of application and is gathering considerable interest in the field of telecommunications. The successful introduction of these new satellite based communication services, however, is driven by the performance that can be achieved, by the good use of the on-board satellite resources and by a clever ground terminal engineering. A key element determining the satellite communication system complexity and efficiency is the network access scheme.

FR-A-8910481 describes a code division multiple access communication system in which the transmission carrier is activated by the user's voice and in which synchronization is achieved by means of a master code. The key feature of this known system is the use of a different user terminal synchronizing scheme in the forward and return links. In the forward link, synchronization is achieved by broadcasting uninterruptedly a master code. In the return link towards the satellite, synchronization is achieved by an alignment procedure based on a forced carrier voice-activation and selection of a user code produced by decoding an element contained in the master code.

The multiple access scheme implemented in this known system is imposing a code period equal to the symbol duration when it is required to achieve a drastic self-noise reduction. These limitations were discussed by R. De Gaudenzi, C. Elia, R. Viola in "Performance Evaluation Of Synchronous Code Division Multiple Access (S. CDMA) For Satellite Mobile Systems", Proceedings of the IEEE Global Telecommunications Conference GLOBECOM'90, San Diego, Calif., Dec. 2-5, 1990.

This known method improves the CDMA system efficiency by reducing the acquisition time of the spread spectrum in the receive circuitries. However, two major problems were emerging.

First, it was established that the performance of the CDMA technique could be improved by combining the spreading code synchronization, as used in the aforementioned known method, with the use of synchronized Gold codes. However, using a synchronized spreading code proved to impede using an efficient error correction system because the implementation of an error correction system results in a decrease in processing capability as a result of the code period reduction and accordingly of the number of available codes.

In addition, a study performed by J. L. Massey and T. Mittelholzer (Technical Assistance For The CDMA Communication System Analysis, Final Report, Institute for Signal and Information Processing CH-8092 ETH, Zurich, September 1990) demonstrated that using preferentially phased Gold codes, i.e. Gold codes having minimum mutual cross-correlation, turns out to be an optimal choice for point-to-multipoint communication network. However, though preferentially phased Gold codes are a straight way to improve power with no reduction in the processing gain and with no bandwidth reduction in a usual asynchronous CDMA system (A-CDMA), this turned out to not be true for a synchronous quasi-orthogonal multiple access system.

As a matter of fact, the coding scheme in such a system results in a reduction in the number of available quasi-orthogonal spreading codes because the symbol rate is increasing for a given bandwidth, thus reducing the number of communication channels available.

These limitations make it difficult to use a code-synchronized CDMA system for commercial applications of a satellite communication system. For instance, for digital sound broadcasting or micro-terminal networks.

The object of the present invention is to overcome the limitations imposed to the use of synchronized codes in a CDMA system and to that purpose there is provided a novel code division multiple access technique.

This object is attained by virtue of the invention by a method and a device for multiplexing signals for transmission at a given rate in a minimum frequency bandwidth through a Code Division Multiple Access satellite communication system, using compact low-power ground and on-board equipments.

In accordance with this invention, the incoming data signals are first individually encoded such that each of said signals is represented by an individual symbol among an N-symbol constellation associated to N separate points, thus generating a bit stream in phase with the incoming signal and a bit stream in quadrature with the incoming signal. Each of said bit streams is assigned a signature in the form of an individual spreading code consisting in a binary sequence having a defined length that is preferentially derived from a preferentially phased Gold code. The individual spreading codes used for both bit streams are quasi-orthogonal codes. The bandwidth of the resulting signals is thus limited by filtering and thereafter both baseband signals are applied to a conventional modulator in which they are used to modulate a carrier in a manner known per se. At the receive end of a link, the signal can be accepted by a low-complexity digital receiver using a local replica of the afore-mentioned spreading codes to produce despread samples which are suitable for being decoded. The carrier frequency and the code phase are kept synchronous using any proper synchronization technique, except in the application of a point-to-multipoint communication as is the case in sound broadcasting because in such an application, the synchronization is achieved automatically.

The system according to the invention provides the following advantages:
1. Highly efficient use of the available transponder power and bandwidth for single and multiple beam satellites,
2. High transmission quality is achieved with mobile or portable terminals, whatever the propagation conditions may be, even in hostile propagation conditions like multipath fading and shadowing,
3. Adaptability to highly variable traffic, i.e. equally efficient and low traffic loads, and this practically without any performance degradation in case of non-nominal conditions, 4. Flexibility to various applications: digital voice or sound broadcasting, data transmission, mixed transmission,
5. Adaptability to various network configurations: star, multi-star, partially meshed networks.
6. Compliance with the power flux density (PFD) requirements for user terminals providing minimum RF interference with other services.

The multiple access system according to the invention is particularly useful in the field of digital broadcasting. Amongst other fields of application it is worth mentioning micro-terminal satellite communication networks (Very Small Aperture Terminal VSAT networks) and cellular broadcasting systems.

The invention is described in more details in the following with reference to the accompanying drawings.

Figure 1:
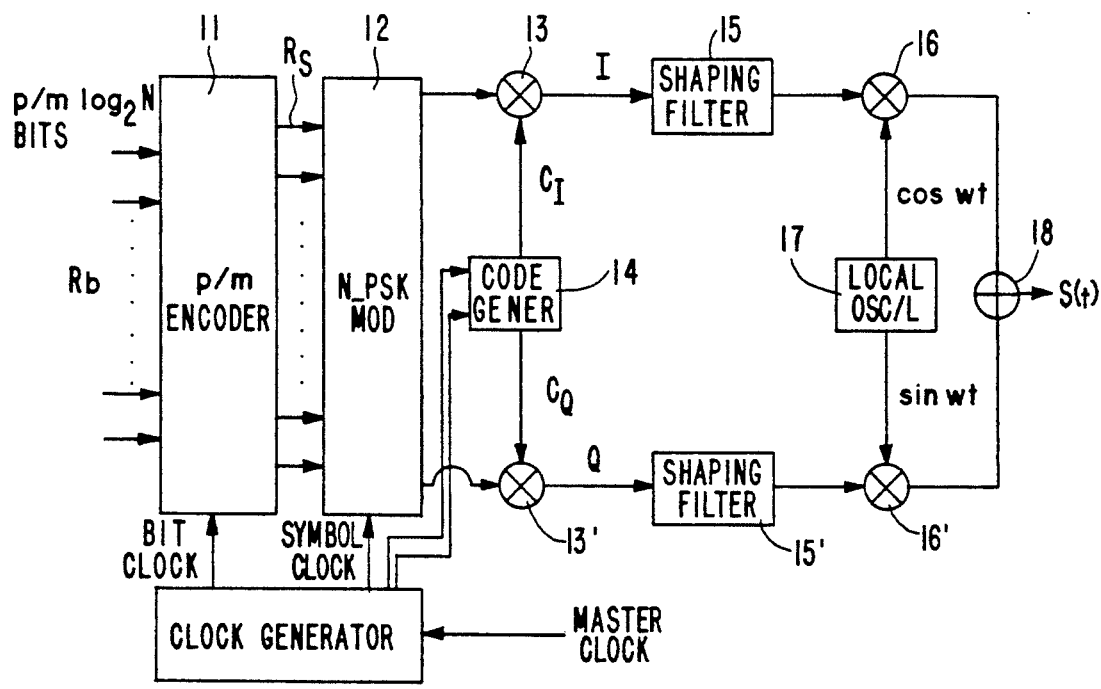
FIG. 1 is a block diagram of an exemplary multiplexing circuitry in accordance with the invention.

The basic concept behind the invention consists in associating each information bit in the incoming data signal to an individual point in an N-point constellation. In practice, this concept is implemented in a circuitry essentially comprising a linear encoder followed an N-PSK modulator. FIG. 1 shows a block diagram of an exemplary circuitry. The encoder 11 receives the incoming bit stream DS and generates $\log_2 N$ symbols for each incoming bit. The output from the encoder is applied to an N-PSK modulator 12 according to a defined coding scheme with a symbol rate $R_s$. The modulator output consists in two complex baseband bit streams I and Q, having a symbol rate where $R_b$ is the bit rate.

The way in which coded symbols are associated to the PSK constellation points is properly selected to optimize the system performance. The target is to maximize the euclidean distance between the transmitted signals. For this purpose a trellis-coding, for instance, is well suited. It is particularly worthy of note that simply modifying the coding/modulation scheme as teached by this invention to perform multiple access, makes it possible to cope with a wide range of particular application requirements in order to increase the bandwidth and/or the spectral efficiency with minor or no modem hardware modifications.

For example, a 8 PSK constellation with a 8-states trellis code provides a 3 dB increase in efficiency with a binary error rate (BER) of $10^{-5}$, that is without decrease in capacity. Moreover, using such a coding scheme has the further advantage of improving insensitivity to non linear amplifier distortions and interference effects. Also, the errors at the decoder output will occur in burst. This type of errors can be corrected easily in the decoder. More complex signal constellations, such as 16 PSK coded with $r=\frac{2}{3}$ for instance, will result in higher power than when using an uncoded 8 PSK constellation with the same capacity.

The signals at the output of modulator 12 are the in-phase I component and quadrature Q component. These binary components are signed individually in two multipliers 13 and 13' using two individual quasi-orthogonal spreading codes $C_I$ and $C_Q$ generated by a code generator 14 so as to produce two spread bit streams forming two blocks. These spreading codes are bit sequences having a length L. In order to minimize the mutual cross-correlation between the different users, the code period L/Rc is preferably chosen equal to the symbol period 1/Rs. The modulator clock and frequency are controlled by a synchronization signal (known per se) of the communication system. This common synchronization signal for all the baseband signals is a precise reference which, if not modulated, is not affected by the data modulation loss.

The length of the spreading codes $C_I$ and $C_Q$ is a major parameter which determines the system performance in terms of self-noise and spread chip timing jitter. In order to keep self-noise low, it is important to limit the timing jitter to within $\pm 0.1$ Tc (where Tc is the spread chip duration). A study made under contract for the Applicant has demonstrated that Gold code families having minimum mutual cross-correlation provide the optimal spreading code.

By using different generator polynomials for generating code families it is possible to generate a number of Gold code families showing quasi-orthogonal cross-correlation properties with codes inside the same family and pseudorandom correlation properties with codes of a different family. This technique is of particular relevance in the case of a multibeam communication satellite for it is then possible to assign a code of different families to different beams thereby to reduce the amount of noise coming from adjacent beams.

Unfortunately, the number of families that can be generated is dependent on the code length. When using a short code, however, it is possible to increase the number of codes by reusing a reverse version of each signature sequence. It can be shown that the new code exhibits the same characteristics as the Gold code and the same pseudorandom cross-correlation properties as the originating family.

The property of generating code sets is useful in a broadcast signal for instance. As a matter of fact, it is possible to assign a given quasi-orthogonal sub-set to the I arm and a different quasi-orthogonal sub-set to the Q arm. Isolation between the I and Q arms is guaranteed to be equal to the cross-correlation of random codes.

The spread bit streams I and Q at the output of the multipliers 13 and 13' are multilevel signals. These signals are shaped in two shaping filters 15, 15' and thereafter applied separately to modulators 16, 16' (known per se) in which they are used to modulate the in-phase and quadrature carrier components generated by a local generator 17. The two modulated signals are then summed in a summing circuit 18 prior to being converted into the intermediate frequency bandwidth in a manner known per se.

Figure 2:
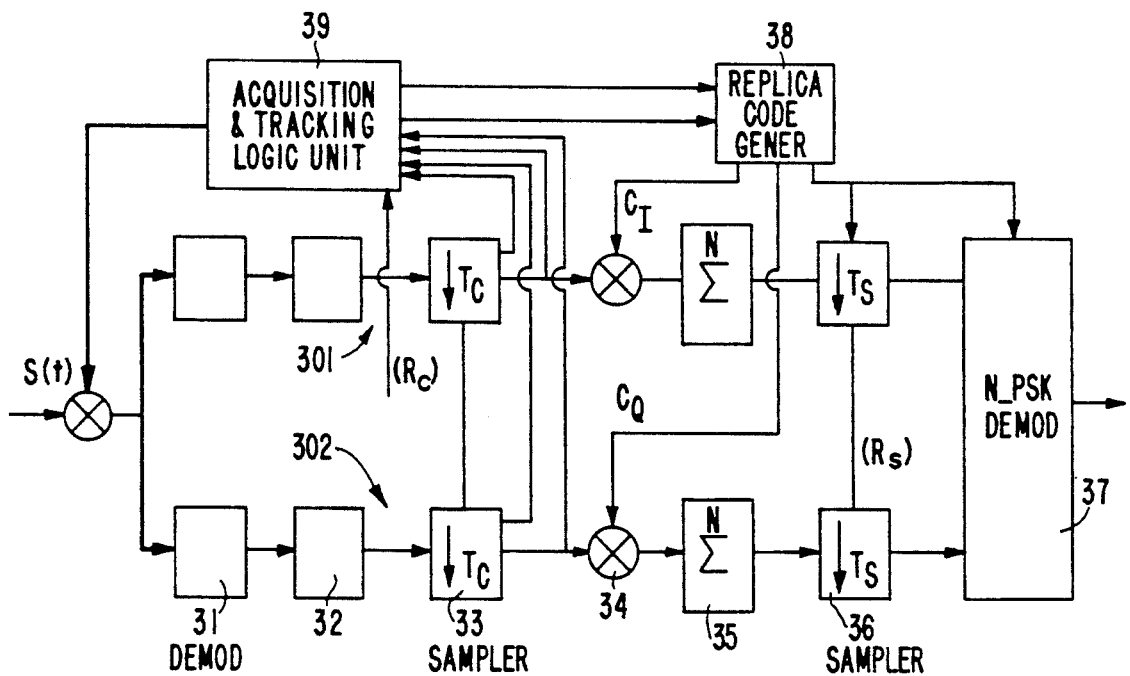
FIG. 2 is a block diagram of an exemplary digital receiver.

At the receiving end of a link, the signals are received in a low complexity digital receiver. Various embodiments are possible. FIG. 2 shows an exemplary block diagram. The receiver circuitry comprises a section operating at a chip rate Rc and a section operating at a symbol rate Rs.

Substantially the receiver comprises two distinct demodulation chains having a common input: one chain 301 for processing the master signal and the other chain 302 for processing the useful data signal. After coherent baseband conversion in a demodulator 31, each signal is filtered in a matched filter 32, and then digitized in a sampler 33 at the rate of one sample per chip. Despreading the signal is thereafter performed by multiplication of the samples with local replicas of the spreading codes $C_I$ and $C_Q$ in multipliers 34 which produce complex sample streams. The local replica code generator 38 is under phase control of an acquisition and tracking logic unit 39 as outlined in "Chips Timing Synchronization in All-Digital Band-limited DS/SS Modem", R. De Gaudenzi, M. Luise, R. Viola, Proceedings of IEEE, International Comm. Conference ICC '91, Denver, Colo., U.S.A., Jun. 23-26, 1991.

After accumulation over one symbol period in accumulators 35, the despread samples are sampled in a sampler 36 at the rate of one sample per symbol. The resulting I and Q samples are then decoded in a baseband N-PSK Trellis demodulator 37 operating at symbol rate.

In order not to degrade the performance when extended Gold codes are used, the network terminals must be synchronized with an error of less than ±0.3 chip.

In case of a point-to-multipoint application (e.g. in sound broadcasting), synchronization is performed by transmitting a reference to all the terminals in the network. In the forward link, the user demodulator 38 can make use of the central clock as a time reference for the useful channel. In the return link, each spreading code is tracked individually in the receiver. Frequency also has to be controlled quite tightly within a predetermined range (e.g. $\pm 6.10^{-2} Rb$).

In a point-to-multipoint application, for instance in a microterminal (M-VSAT) network, a more sophisticated synchronization technique has to be adopted. Generally, the synchronization technique proved not to be critical in practical applications. As a matter of fact, the chip rate (Rc) is normally kept low (<3 Mchip/s). Moreover, a few terminals being out of synchronization does not provoke catastrophic consequences for the network.

A variety of synchronization techniques may be used in a quasi-synchronous system. The presence of a reference available to all the terminals in the network suggests the use of a master-slave synchronization technique as described e.g. in "Telecommunication System Engineering", W. S. Lindsley and M. K. Simon, Prentice Hall Englewood Cliffs N.J., 1973.

Master signal level monitoring at terminals provides a tool useful for open-loop power control. Once the master code is correctly synchronized at the user demodulator, the synchronization process continues with the transmitter clock being corrected to compensate for propagation delay variations.

One can distinguish between two types of closed loop synchronization techniques. In a centralized closed loop, synchronization at a remote terminal is aided by a control station. In a local closed loop, the terminal autonomously provides alignment by receiving its own echo looped back by the satellite. The echo is compared with the local replica and the error signal generated is proportional to the delay estimate. In order to reduce to a minimum the number of tracking circuitries, delay tracking can be performed in closed loop mode. The synchronization error is determined at the hub station and transmitted to the mobile terminal using the communication channel. For fixed small earth stations, synchronization is not critical and can be performed in local or centralized mode.

The multiplexing method according to the invention allows satellite communication systems to be realized, which are well suited for future commercial applications using low-complexity and low-cost modems to be implemented at the terminal stations for performing the coherent demodulation of the received signals with low loss (1-2 dB only). Moreover, thanks to a high spectral and energetic efficiency, the method of the invention allows networks to be implemented which comprise small terminal stations capable of handling data at a rate of some hundreds Kb/s per channel, e.g. micro VSAT and mobile stations.

Figure 3:
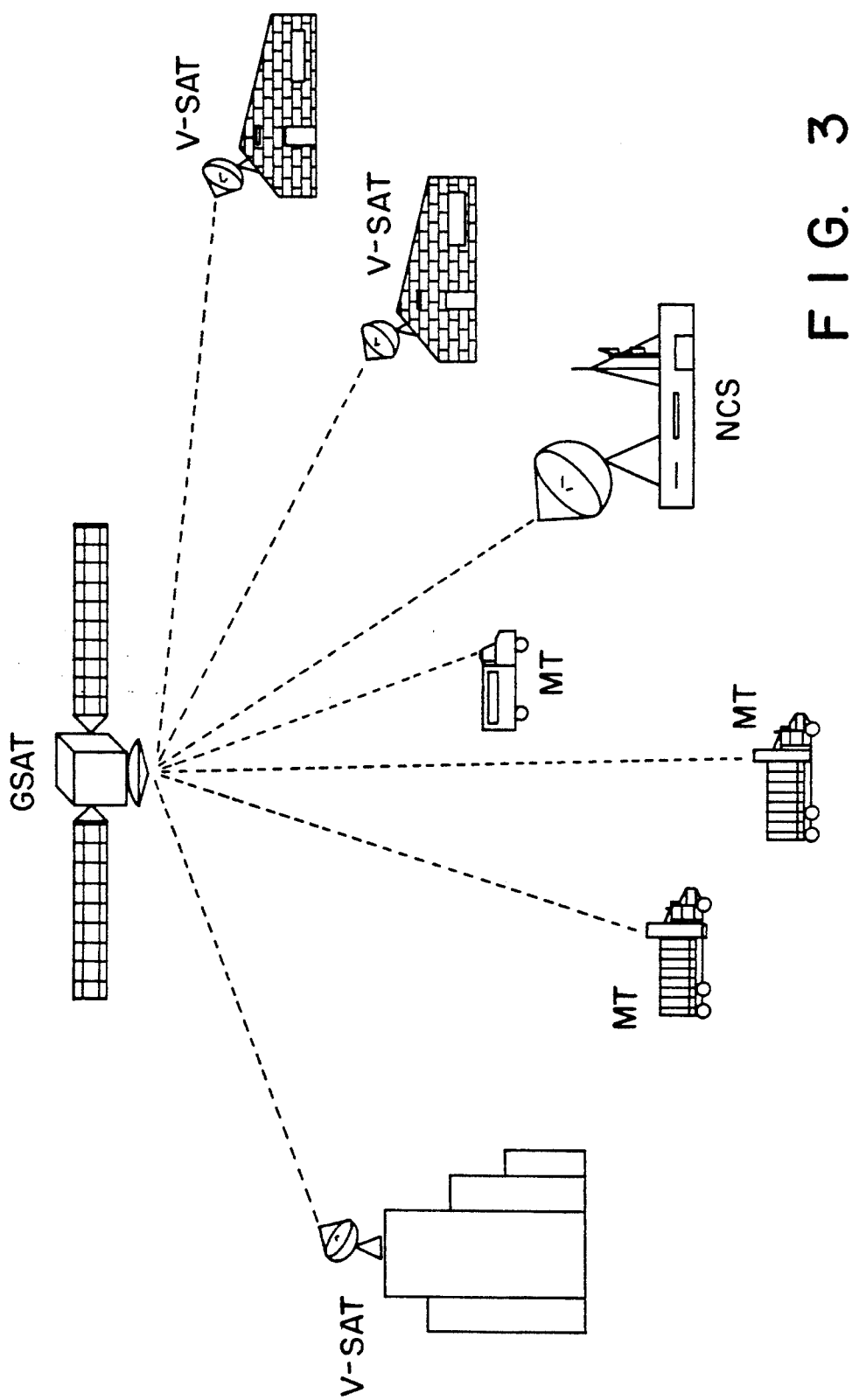
FIG. 3 illustrates diagrammatically as an example a typical application of the multiple access system of the invention.

FIG. 3 diagrammatically depicts by way of example a typical network that can be implemented in carrying out the multiplexing method of the invention. The network allows a great number of microterminals MT to be interconnected with several hub stations VSAT by means of communication channels cooperating with a geostationary satellite GSAT. Control and coordination of the network are achieved through a coordination hub station NCS. Some microterminals MT may be mobile stations. Communications can be established, using the invention, with excellent performances.

Figure 4:
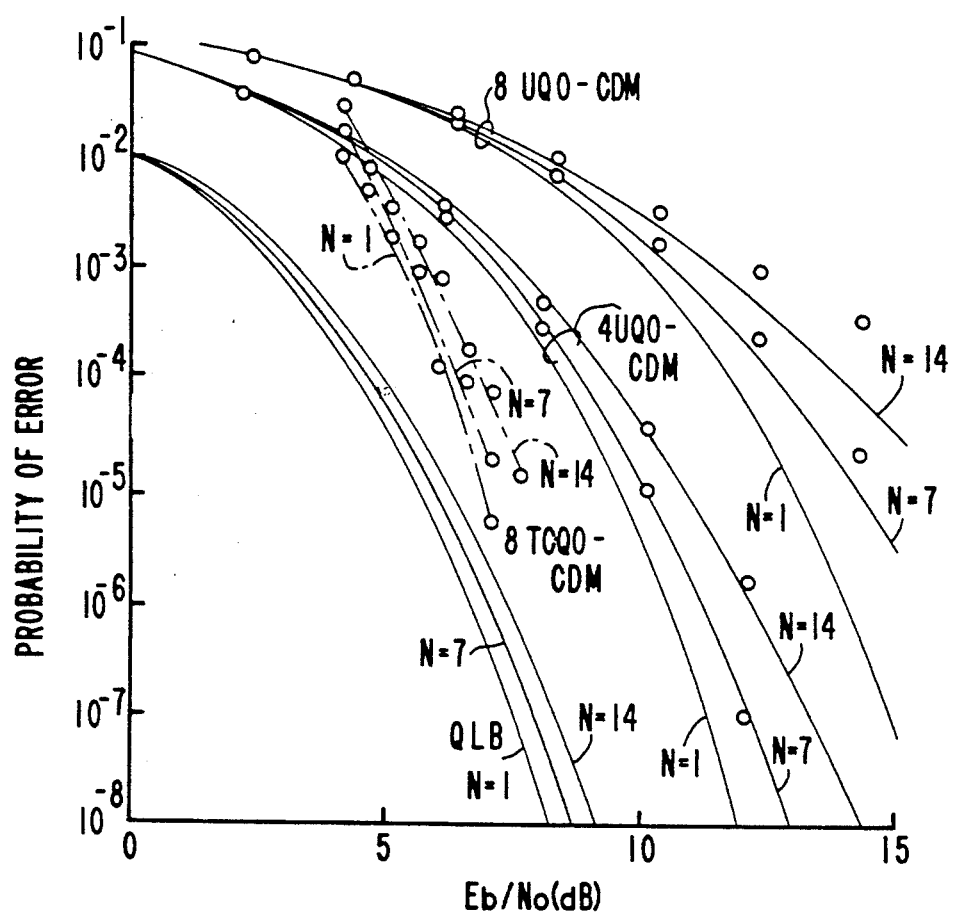
FIG. 4 is a diagram showing the performance of a system according to the invention.

The performances that may be expected with the invention have been analysed by means of a simulation approach. FIG. 4 shows the variation of the probability of error as a function of the signal-to-noise ratio for uncoded 8 PSK quasi-orthogonal CDM (8UQO-CDM), for uncoded 4 PSK quasi-orthogonal CDM (4UQO-CDM) and for 8-states trellis-coded quasi-orthogonal CDM (8 TCQO-CDM), for uncoded 4 PSK quasi-orthogonal CDM (4UQO-CDM) and for 8-states trellis-coded quasi-orthogonal CDM (8TCQO-CDM) for a processing gain of 15.5 with N=1, 7 and 14 (N is the number Of transmitters) as compared with the quasi-lower limits (QLB) calculated for N=1, 7 and 14. The results show that the performance obtained is substantially constant whatever the spreading code length may be.

It should also be emphasized that owing to the ease with which synchronization can be maintained between transmitter and receiver terminals, it is possible to implement low-complexity modems that are particularly suitable to small terminals. Moreover, simple and compact terminal modems, that are well suited for a large scale integration, can be used to advantage in implementing a digital sound broadcasting. In this typical application of a point-to-multipoint network, the synchronization can be achieved by using a reference proper to the transmission system itself, in particular the master code of the CDMA system as outlined in the foregoing.

It should be understood that the embodiments described in the foregoing are examples given by way of illustration and the invention is nowise limited to these examples. Any modification, any variation and any equivalent arrangement should be considered as being within the scope of the invention.

I claim:

1. In a Code Division Multiple Access satellite communication system, a method of multiplexing data signals to be transmitted on a modulated transmission carrier to a plurality of terminal stations by phase-shift keying carrier modulation, said method comprising the steps of:

prior to modulating the transmission carrier, individually encoding each binary signal into an individual symbol pertaining to a constellation of a finite number of symbols associated to the same number of distinct points so as to produce first and second bit streams, the first bit stream being in phase with an incoming signal and the second bit stream being in phase-quadrature with said incoming signal, and assigning to each of said two bit streams an individual signature by applying an individual spreading code to such bit stream thereby to produce two spread code to such bit stream thereby to produce two spread composite bit streams intended each to being applied to a modulator, the individual spreading codes being in quasi-orthogonal cross-correlation therebetween.

2. The method defined in claim 1, wherein the spreading codes are bit sequences derived from a preferentially-phased Gold code.

3. The method defined in claim 2, wherein the spreading codes pertain to several code families, the codes in each family having quasi-orthogonal cross-correlation properties in relation to other codes of the same family and having pseudorandom correlation properties with codes pertaining to a different family.

4. A device for multiplexing data signals comprising:
a linear encoder arranged to accept data signals in an incoming bit stream from a data source and to generate coded bit streams,
a phase shift keying modulator having a finite number of states and arranged to receive the coded bit streams from said linear encoder and to produce in response thereto, first and second distinct bit streams, the first bit stream being in phase with the incoming bit stream and the second bit stream being in phase-quadrature with the incoming bit stream,
a pair of combining devices connected, respectively, to an output of a separate phase shift keying modulator for combining each bit stream with an individual spreading code so as to produce each a spread composite bit stream for modulating a transmission carrier, said two spreading codes being in quasi-orthogonal cross-correlation therebetween, and
a spreading code generator arranged to generate said two spreading codes.

5. The device defined in claim 4, including a shaping filter connected to the output of each of said combining devices.

* * * * *

UNITED STATES PATENT AND TRADEMARK OFFICE
CERTIFICATE OF CORRECTION

PATENT NO. : 5,327,455

DATED : July 5, 1994

INVENTOR(S) : DE GAUDENZI, ET AL.

It is certified that error appears in the above-indentified patent and that said Letters Patent is hereby corrected as shown below:

COLUMN 2

Line 47, "afore-mentioned" should read --aforementioned--.

COLUMN 3

Line 30, add "by" after --followed--.
Line 38, "rate where" should read --rate $$R_s = \frac{R_s^1}{\log_2 N} = \frac{M}{P} \cdot \frac{R_b}{\log_2 N}$$

where--.

Line 45, "teached" should read --taught--.
Line 56, "non linear" should read --nonlinear--.
Line 58, "errors" should read --error--.

UNITED STATES PATENT AND TRADEMARK OFFICE
CERTIFICATE OF CORRECTION

PATENT NO. : 5,327,455                      Page 2 of 2
DATED     : July 5, 1994
INVENTOR(S) : DE GAUDENZI, ET AL.

It is certified that error appears in the above-indentified patent and that said Letters Patent is hereby corrected as shown below:

COLUMN 6

Line 30, "Of" should read --of--.
Line 54, "I claim:" should read --We claim:--.

COLUMN 7

Line 4,  Line 4 should be deleted.
Line 5,  "spread" should be deleted.
Line 19, "in" should read --on--.

COLUMN 8

Line 12, delete "each".

Signed and Sealed this

Twenty-seventh Day of June, 1995

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,327,455
DATED : July 5, 1994
INVENTOR(S) : DE GAUDENZI, ET AL

It is certified that error appears in the above-indentified patent and that said Letters Patent is hereby corrected as shown below:

On the title page: Item [73] Assignee: "Agence Spatials Europeene" should read -- Agence Spatiale Européenne --.

Signed and Sealed this

Twenty-sixth Day of September, 1995

Attest:

BRUCE LEHMAN

*Attesting Officer*　　　　*Commissioner of Patents and Trademarks*